April 15, 1969 M. I. BEHR ET AL 3,439,354

AVERAGE SPEED CHECKER FOR TAPE TRANSPORT

Filed May 24, 1965

INVENTORS.
MICHAEL I. BEHR
ERWIN A. HAUCK
BY Christie, Parker & Hale
ATTORNEYS.

United States Patent Office 3,439,354
Patented Apr. 15, 1969

3,439,354
AVERAGE SPEED CHECKER FOR TAPE TRANSPORT

Michael I. Behr, South Pasadena, and Erwin A. Hauck, Arcadia, Calif., assignors to Burroughs Corporation, Detroit, Mich., a corporation of Michigan Filed May 24, 1965, Ser. No. 458,290
Int. Cl. G11b *5/00*
U.S. Cl. 340—174.1 5 Claims

ABSTRACT OF THE DISCLOSURE

Apparatus for determining whether the average speed of a moving tape at the beginning of a write operation departs from a predetermined speed by more than an allowable amount. A first bit of a block of information being written onto the tape by a write head is sensed as it passes a read head. Circuitry is provided to set a bistable element to its first condition and to trigger a monostable multivibrator both in response to the transmission of only the first bit of a block of information and to reset the bistable element to its second condition in response to the sensing of the first bit. The period of the multivibrator is set equal to the maximum allowable time for the tape to travel between the write head and the read head and an error signal is provided whenever the multivibrator resumes its stable state prior to the resetting of the bistable element.

Figure 1:
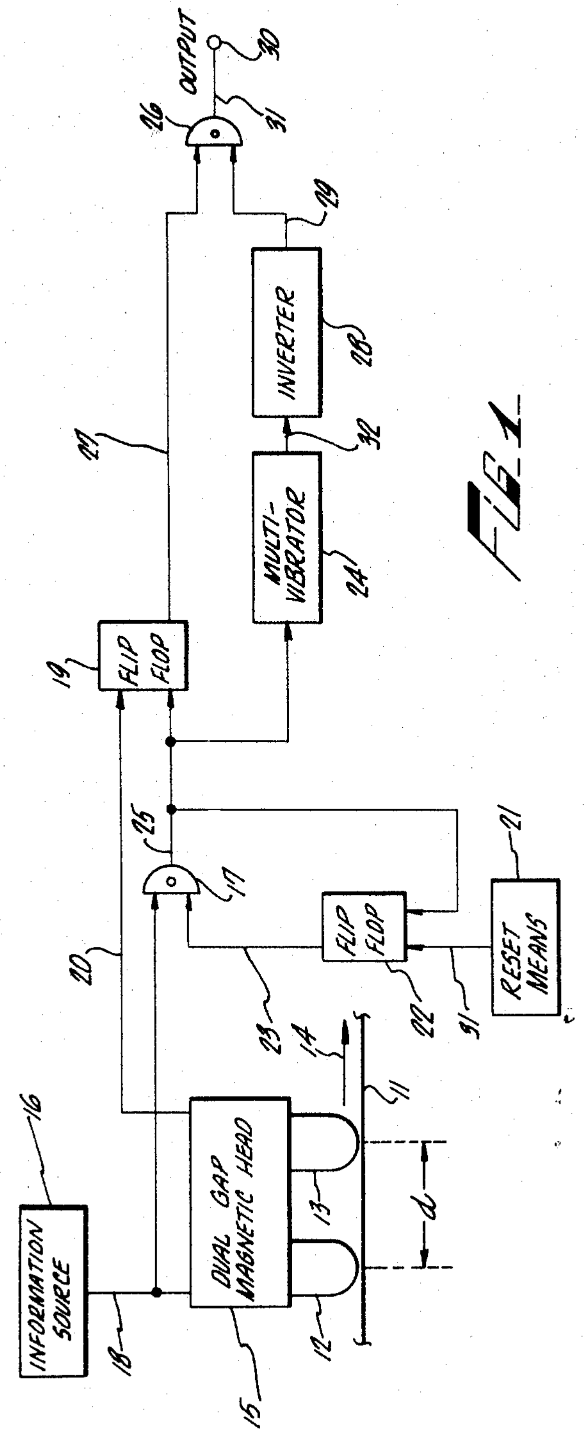

This invention relates to tape systems and, more particularly, to apparatus for determining when the average speed of the tape at the beginning of a write operation departs from a predetermined speed by more than an allowable amount.

Uniform passage of tape on a magnetic tape transport is dependent on such factors as tape drive, buffers and environment. Environmental factors include humidity, temperature and contamination. Erratic drive during any write cycle is of particular concern since it leaves a permanent history recorded upon the tape at the time the speed variation occurred. Such erratic drive during a write cycle may interfere with a subsequent reading of the recorded information from the tape.

Because of the generally larger skew margins existing during the write phase of operation compared to those existing during a subsequent read phase, large speed changes during the write phase may go undetected at the time of their occurrence. If speed retardation occurs during the write phase, information recorded on the tape will be compressed within a smaller length of the tape than if the tape had been up to speed during the write phase. If the compression is severe enough, the record cannot be read during the subsequent read phase.

Some known methods of determining whether a magnetic tape is up to speed require that a particular pattern of information characters, useful only for determining the speed of the tape, be written into the tape. Such methods often prove to be cumbersome and complicated. Moreover, if the speed of the tape is to be checked prior to the writing into the tape of each of a number of blocks of information, the particular speed-determining pattern of characters must be written into the tape prior to the writing of each block of information.

An advantage of the present invention is that it checks the average speed of the tape as each block of information is written into the tape without requiring that any speed-determining characters be written into the tape. Random information values to be written into the tape are themselves utilized to determine whether the tape is up to speed.

Another advantage of the present invention is that it provides an economical tape speed checking means.

The preceding and other advantages of the present invention are achieved by means of comparing the time in which a particular point on the tape passes between two fixed points with the time it would take to pass these same two points when the tape is travelling at normal speed. The two measuring points must of course be a known distance apart. In the present invention these two points are determined by the location of a write and read head, respectively. Since the distance between two such heads may be accurately controlled, a particular bit of information written into the tape by the write head will be subsequently sensed by the read head a known period of time after it was written if the tape is travelling at normal speed. Any variation from normal in the period of time between the writing and reading of the bit of information is indicative that the average speed of the tape, between the time the bit was written and read, departed from normal. Advantageously, a dual head in which a write head and read head are positioned closely together within a single unitary housing may be utilized in conjunction with the present invention.

Since some variation from normal in the speed of the tape may be permissible, circuitry associated with the present invention may be utilized to effect a rewriting of information into the tape whenever the average tape speed had departed from normal by more than a predetermined amount during the initial writing of the information.

Figure 2:
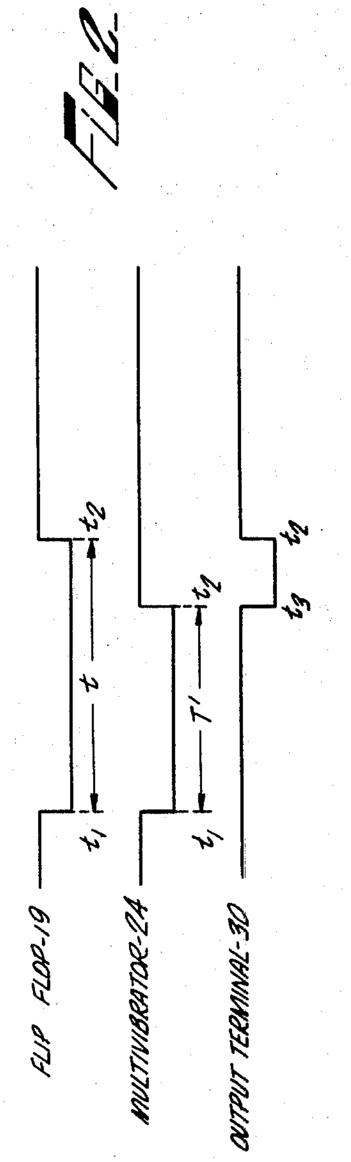

The manner of operation of the present invention and the manner in which it achieves the above and other advantages may be more clearly understood by reference to the following detailed description when considered with the drawing, in which:

FIG. 1 depicts a schematic representation of a preferred embodiment of the present invention; and FIG. 2 depicts illustrative pulses associated with elements shown in FIG. 1.

FIG. 1 depicts a magnetic tape 11 which is driven in a conventional manner past magnetic write head 12 and magnetic read head 13 in the direction indicated by arrow 14. The means for driving the tape past the heads is, for illustrative purposes, not shown in FIG. 1 and may comprise any well known tape driving means. The heads 12 and 13 are shown to be housed within a standard dual gap magnetic head 15. In such a dual gap head, write head 12 and read head 13 are positioned closely together and the distance between them is accurately controlled. As shown in FIG. 1, the two heads 12 and 13 are positioned a distance *d* apart.

Information source 16 is shown to be connected to the "write" portion of dual gap magnetic head 15 and to AND gate 17 by lead 18. The "read" portion of head 15 is connected to flip-flop 19 by lead 20. Reset means 21 is connected to flip-flop 22 by lead 31. An output terminal on flip-flop 22 is connected to AND gate 17 by lead 23. The output terminal of gate 17 is connected to flip-flop 19, multivibrator 24 and to flip-flop 22 by lead 25. An output terminal of flip-flop 19 is connected to AND gate 26 by lead 27 and the output terminal of multivibrator 24 is connected by lead 32 to inverter 28, the output of which is connected to gate 26 by lead 29. Finally, the output terminal of gate 26 is connected to output terminal 30 by lead 31.

Information source 16 is shown in block diagram form and may represent any well known means for supplying, to the "write" portion of duel gap magnetic head 15, information signals which are to be recorded on the tape.

Reset means 21, also shown in block diagram form, may represent any well known means for resetting flip-flop 22 just prior to the transmission of each block of information from source 16. Flip-flop circuits 19 and 22 are also shown in block diagram form and may represent any well-known bistable circuits commonly referred to as "flip-flop" circuits.

A multivibrator 24, also shown in block diagram form, represents a monostable multivibrator producing an output signal of predetermined duration in response to an applied input signal. Inverter 28 may represent any well known circuit capable of transmitting an output signal only in the absence of a signal applied to its input terminal.

As discussed previously, any speed retardation of tape 11 which occurs during the write phase of operation will result in a compression of the record stored on the tape and may prevent the record from being read during a subsequent read phase of operation. This results since a shorter than normal length of tape 11 passes under magnetic write head 12 during the writing of information onto the tape. The embodiment of the present invention shown in FIG. 1 enables such speed retardation to be immediately detected and permits any information written upon the tape at a time when the tape has not been brought sufficiently up to speed to be immediately rewritten upon the tape after the tape has been brought up to speed.

Since the write head 12 and read head 13 are positioned a known distance $d$ apart, a particular portion of the tape at which an information bit has been recorded by write head 12 will pass under read head 13 at a known time subsequent to its passage under head 12 if the tape is being driven past these heads at normal speed. Thus, if an information bit is sensed by head 13 at a time $t$ after being recorded upon the tape by head 12, the average speed of the tape during this time $t$ is found by the relationship $V_{av}=d/t$. Therefore, the particular time $T$ within which a point on tape 11 should pass from head 12 to head 13 is given by $T=d/V$ where $V$ is the normal speed of tape 11. Since some discrepancy from normal in the speed of the tape as it passes heads 12 and 13 will generally be permissible, a time T′ may be determined for particular applications of the present invention where T′ represents the maximum allowable time within which a point on tape 11 must pass between heads 12 and 13, at the commencement of the write phase of operation, without necessitating that the information then being written be rewritten. The time T′ thus represents a time period which may be chosen in accordance with design criteria relevant to particular applications in which the present invention is used.

Thus, for example, in an application in which the present invention has been utilized, the distance between heads 12 and 13 was .150 inches, normal speed of the tape 11 past these heads was 90 inches per second, and T′ was chosen such that the recording of information onto the tape would be prevented whenever average tape speed, at the commencement of a write phase of operation, was more than 20% below normal.

Multivibrator 24 is designed to have an output signal with a time duration equal to the time period T′.

As each block of information from source 16 is recorded on tape 11, the initial portion of each such block is utilized to determine if the average tape speed is within permissible limits. Prior to the recording of each block of information from source 16 on tape 11, reset means 21 as utilized to reset flip-flop 22. With flip-flop 22 in its reset condition, a signal is applied via lead 23 to AND gate 17. As the first bit of the block of information is transmitted from source 16 to write head 12 via lead 18, a signal is applied via lead 18 to AND gate 17. In response to the two signals applied to AND gate 17, a signal is transmitted to lead 25 which sets flip-flop 19, sets flip-flop 22, and activates monostable multivibrator 24. Thus, the setting of flip-flop 19 and the activation of multivibrator 24 occur simultaneously with the recording on tape 11 of the initial bit of a block of information. The information bit recorded upon tape 11 at this time is subsequently sensed by read head 13 when the portion of the tape upon which the initial bit was recorded passes under read head 13. The sensing of this bit by read head 13 is effective to transmit a signal to flip-flop 19 via lead 20 which resets flip-flop 19. Flip-flop 19 is thus in its set condition for whatever length of time it has taken the point on tape 11 at which the initial bit of a block of information was recorded to reach read head 13. If this period of time is less than the period T′ previously determined as being the maximum allowable time within which this bit should have reached head 13, then the tape speed is satisfactory. If, however, the time between the setting and resetting of flip-flop 19 is longer than the period T′, then the average tape speed at the commencement of the recording of this block of information is too slow and the block of information should be re-recorded after the tape has been brought up to speed.

The multivibrator 24 produces an output signal for a period of time T′ which commences with the setting of flip-flop 19. Inverter 28 thus produces an output signal upon lead 29 which commences upon the termination of the output signal generated by multivibrator 24. An output signal is passed by gate 26 via lead 31 to output terminal 30, therefore, only if flip-flop 19 remains in a set condition for longer than the period T′. Thus, an output signal appearing at terminal 30 is indicative that the average tape speed at the commencement of the recording of a block of information is insufficient and that this block of information should be re-recorded upon the tape after the tape has been brought up to speed.

The operation of the circuit shown in FIG. 1 may be more readily understood by considering the pulse diagrams shown in FIG. 2. Thus, for example, if flip-flop 19 is set at time $t_1$, simultaneously with the recording on tape 11 of the initial bit of a block of information, and is reset at time $t_2$, in response to the sensing of this bit by read head 13, a signal will be applied to lead 27 by flip-flop 19 for a period of time $t$ commencing at $t_1$ and terminating at $t_2$. Similarly, multivibrator 24 generates an output signal which commences at time $t_1$ and lasts for a predetermined duration T′, shown in FIG. 2 to end at time $t_3$. Output terminal 30 is shown to have an output signal applied thereto at time $t_3$ which terminates at time $t_2$. An output signal is applied to terminal 30 only when the period $t$ is greater than the period T′. Whenever the period $t$ is equal to or smaller than the period T′, the average speed of tape 11 is greater than the predetermined minimum allowable speed, no output signal appears at terminal 30 and no rewriting of the block of information presently being recorded on tape 11 need be effected.

The speed of the tape 11 may conveniently be checked at the commencement of each block of information being recorded on tape 11 by applying a signal from reset means 21 to flip-flop 22 resetting this flip-flop prior to the recording of each block of information.

Although the present invention has been described in FIG. 1 in connection with a means for determining if the tape speed falls below a predetermined minimum value, it may easily be adapted to determine whether the tape speed exceeds a predetermined maximum value. Thus, for example, if the inverter 28 shown in FIG. 1 were connected between flip-flop 19 and gate 26 rather than between multivibrator 24 and gate 26, the gate 26 would pass a signal to terminal 30 whenever the period T′ shown in FIG. 2 exceds the period $t$ shown in FIG. 2. Thus, if T′ represented the length of time corresponding to the maximum permissible speed of the tape 11, any actual period $t$ smaller than T′ would indicate that the average tape speed exceeded the predetermined maximum. An error signal would therefore appear at terminal 30 whenever any actual period $t$ is smaller than T′.

What have been described are considered to be only illustrative embodiments of the present invention and, accordingly, it is to be understood that various and numerous other arrangements may be devised by one skilled in the art without departing from the spirit and scope of this invention.

What is claimed is:

1. In a magnetic tape system a means for checking the speed of the tape comprising:
a magnetic write head coupled to the tape for recording blocks of binary information on the tape as it moves past the write head;
a magnetic read head coupled to the tape for sensing information recorded on portions of the tape moving past the read head;
the read head positioned a fixed distance from the write head;
means for sequentially transmitting signals representative of each block of information to the write head;
a bistable circuit;
means for triggering the bistable circuit to a set condition in response to the transmission of the first bit of a first block of information;
means for preventing the bistable circuit from being triggered to its set condition in response to the transmission of subsequent bits of the first block of information;
means for retriggering the bistable circuit to a reset condition in response to the sensing by the read head of the first bit of the first block of information;
the portion of the tape having the first bit of the first block of information recorded thereon passing the read head a first period of time after being recorded thereon;
any portion of the tape passing the read head a second predetermined period of time after passing the write head when the tape is moving at normal speed; and
means for determining whether the first period departs from the second period by more than a predetermined amount.

2. In a magnetic tape system a means for checking the speed of the tape according to claim 1 in which the read head and write head are positioned closely together within a single housing.

3. In a magnetic tape system a means for determining whether the speed of the tape exceeds a predetermined minimum speed comprising:
a magnetic write head coupled to the tape for recording blocks of binary information on the tape as it moves past the write head;
a magnetic read head coupled to the tape for sensing information recorded on portions of the tape moving past the read head;
the read head positioned a fixed distance from the write head;
means for sequentially transmitting signals representative of each block of information to the write head;
a bistable circuit;
means for triggering the bistable circuit to a set condition in response to the transmission of the first bit of a first block of information;
means for preventing the bistable circuit from being triggered to its set condition in response to the transmission of subsequent bits of the first block of information;
means for retriggering the bistable circuit to a reset condition in response to the sensing by the read head of the first bit of the first block of information;
the portion of the tape having the first bit of the first block of information recorded thereon passing the read head a first period of time after being recorded thereon;
any portion of the tape passing the read head a second predetermined period of time after passing the write head when the tape is moving at the predetermined minimum speed;
a monostable multivibrator circuit the output signal of which is of a fixed time duration equal to the second predetermined period of time;
means for triggering the multivibrator in response to the transmission of the first bit of the first block of information; and
means for providing an error signal whenever the bistable circuit remains in the set condition upon termination of the multivibrator output signal.

4. In a magnetic tape system a means for determining whether the speed of the tape exceeds a predetermined minimum speed according to claim 3 in which the read head and write head are positioned closely together within a single housing.

5. In a magnetic tape system a means for determining whether the speed of the tape, as recording of each of a series of blocks of information commences, exceeds a predetermined minimum speed comprising:
a magnetic write head coupled to the tape for recording each block of information on the tape as it moves past the write head;
a magnetic read head coupled to the tape for sensing information recorded on portions of the tape moving past the read head;
the write and read heads positioned closely together within a single housing;
means for sequentially transmitting signals representative of each block of information to the write head;
any portion of the tape passing the read head a standard predetermined period of time after passing the write head when the tape is moving at the predetermined minimum speed;
a bistable circuit;
means for triggering the bistable circuit to a set condition in response to the transmission of the first bit of each block of information;
means for preventing the bistable circuit from being triggered to its set condition in response to the transmission of bits of each block of information subsequent to the first bit of each block;
means for retriggering the bistable circuit to a reset condition in response to the sensing of the first bit of each block of information;
a monostable multivibrator circuit the output signal of which persists for a fixed period of time equal to the standard predetermined period of time;
means for triggering the multivibrator in response to the transmission of the first bit of each block of information; and
means for providing an error signal whenever the multivibrator output signal terminates prior to the retriggering of the bistable circuit to its reset condition.

References Cited

UNITED STATES PATENTS

| | | | |
|---|---|---|---|
| 2,922,231 | 1/1960 | Witt et al. | 340—174.1 |
| 3,172,091 | 3/1965 | Friend | 340—174.1 |

BERNARD KONICK, *Primary Examiner.*

BARRY L. HALEY, *Assistant Examiner.*

U.S. Cl. X.R.

179—100.2